United States Patent [19]

Nalle, Jr.

[11] Patent Number: 4,567,011

[45] Date of Patent: Jan. 28, 1986

[54] MANUFACTURE OF HELICAL NETS

[76] Inventor: George S. Nalle, Jr., 401 Inwood Rd., Austin, Tex. 78746

[21] Appl. No.: 602,126

[22] Filed: Apr. 19, 1984

[51] Int. Cl.$^4$ ............................................. B29D 28/00
[52] U.S. Cl. .................................... 264/504; 264/147; 264/156; 264/167; 264/171; 264/284; 264/288.4; 264/288.8; 264/DIG. 47; 264/DIG. 81
[58] Field of Search ................ 264/167, 171, 504, 145, 264/288.8, 284, 156, DIG. 47, DIG. 81, 288.4, 146–147, 103, 154

[56] References Cited

U.S. PATENT DOCUMENTS

| | | | |
|---|---|---|---|
| 3,484,916 | 12/1969 | Johnstone | 264/DIG. 47 |
| 3,642,967 | 2/1972 | Doll | 264/288.8 |
| 3,790,652 | 2/1974 | Colijn et al. | 264/146 |
| 3,851,034 | 11/1974 | Harmon et al. | 264/DIG. 47 |
| 4,020,208 | 4/1977 | Mercer et al. | 264/167 |
| 4,135,021 | 1/1979 | Patchell et al. | 264/288.8 |
| 4,151,240 | 4/1979 | Lucas et al. | 264/504 |
| 4,209,563 | 6/1980 | Sisson | 264/288.8 |
| 4,353,956 | 10/1982 | Nalle, Jr. | 428/255 |
| 4,410,587 | 10/1983 | Fair et al. | 264/167 |
| 4,426,343 | 1/1984 | Vittone et al. | 264/288.8 |

FOREIGN PATENT DOCUMENTS 54-97675  8/1979  Japan ............................ 264/288.8

Primary Examiner—Jeffery Thurlow
Attorney, Agent, or Firm—C. Lamont Whitham

[57] ABSTRACT

An improved process of manufacturing a plastic helical net is disclosed. The process begins by co-extruding two or more plastic materials characterized by having different properties of contraction and orientation to form a bi-component sheet. Holes or impressions are formed in the sheet at regular intervals as by embossing, drawing, punching or slitting, and then the sheet is oriented, as by stretching, well below the melt temperature of the materials, and then releasing.

8 Claims, 3 Drawing Figures

MANUFACTURE OF HELICAL NETS

FIELD OF THE INVENTION

The present invention relates to net-like structures of the type having a partial to a multiplicity of spirals between interstices or crossings of the net filaments and, more particularly, to improvements in the manufacture of such helical nets.

BACKGROUND OF THE INVENTION

A plastic net with a partial to a multiplicity of sprirals between the interstices or crossings of the net filaments is disclosed in my prior U.S. Pat. No. 4,353,956. To make that net, conventional relatively rotating or reciprocating extrusion die members were used with the modification that each orifice of both die members were fed with two different plastic materials characterized by having different properties of contraction and orientation. One material may be a synthetic elastomeric rubber-like material, such as a thermoplastic rubber, and the other a plastic material, such as polyproplene or polyethylene. The net was extruded from the die head in the usual manner, and then the filaments were oriented, as by stretching, well below the melt temperature of the materials, and then releasing. This causes the filaments to contract into helices. The number of helical revolutions or spirals between interstices or crossings may vary from a multiplicity of revolutions to only a partial revolution, this being controlled by the choice of spacing between interstices and the choice and proportions of materials exhibiting the desired properties.

This procedure for manufacturing the net produces satisfactory results for small net structures but becomes increasingly difficult to control as the size of the nets are increased. What is needed is a manufacturing process for my helical net-like structures which is capable of producing the nets to any size with uniform control.

SUMMARY OF THE INVENTION

It is therefore an object of the present invention to provide an improved manufacturing process for the production of helical net-like structures.

It is a more specific object of the invention to provide a process of manufacture of plastic helical net-like structures which permits uniform control of production of any size net.

The foregoing and other objects of the invention are attained by extruding a planar, multi-component plastic sheet in which holes are formed as by embossing, drawing, punching or slitting and then orienting, as by stretching and then releasing. The holes may be formed prior to the step of orienting or may form during the step of orienting due to the rupture of the flashing produced in an embossing step, for example. In any case, the holes define filaments in a net-like structure. The resulting product is a net-like structure with a partial to a multiplicity of spirals between interstices or crossings of the net filaments which is the full equivalent to the helical net disclosed in my prior U.S. Pat. No. 4,353,956.

BRIEF DESCRIPTION OF THE DRAWINGS

The foregoing and other objects, advantages and aspects of the invention will be better understood from the following detailed description of the invention with reference to the drawings, in which.

DETAILED DESCRIPTION OF THE INVENTION

The procedure of extruding bi-component filaments from relatively rotating or reciprocating die members to produce a helical net has been successfully used to manufacture a number of different products ranging from a soft elastic net with small spacings between interstices to a semi-rigid net with relatively larger spacings between interstices. The former structure has utility as padding in a dressing for a wound, for example, and the latter structure can be used as a scouring pad for cleaning tools and articles of clothing such as shoes and boots. In the manufacture of these structures, however, there is a limit to the practical size of the net dictated by the diameter or length, respectively, of the relatively rotating or reciprocating die members. Furthermore, it is difficult to uniformily control the co-extrusion of the two components which are fed to the orifices of the die members, and this difficulty is aggravated with increase in size of the net to be extruded.

Figure 2:
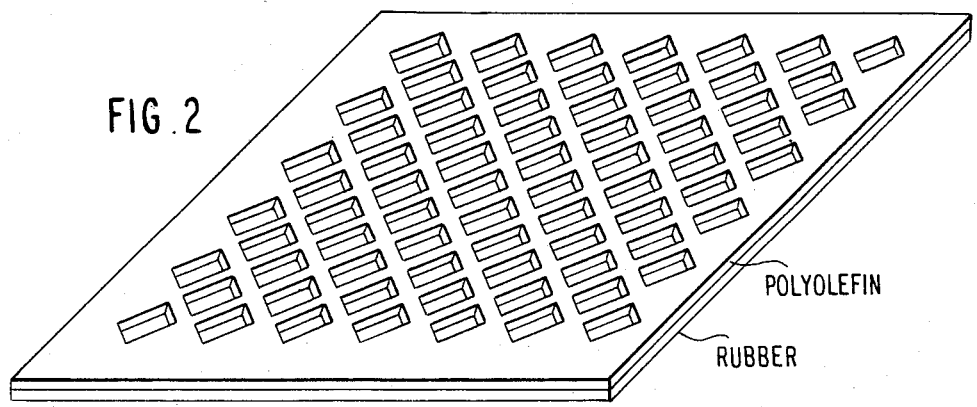
FIG. 2 is an isometric view showing a bi-component plastic sheet which has been punched to form diamond-shaped holes therein prior to orientation.

After some experimentation, I have found that I can make a helical net without the difficulties encountered before by first extruding a planar, bi-component sheet. The sheet is made by the co-extrusion of two materials characterized by having different properties of contraction and orientation. As before, one material may be a synthetic elastomeric rubber-like material, such as thermoplastic rubber, and the other a plastic material, such as polypropylene or polyethylene. The bi-component sheet is extruded in the conventional manner and then holes are formed in it in a regular pattern as by punching or slitting. More specifically, square shaped or diamond shaped holes may be punched in the sheet by passing it between a punching roller thereby making the bi-component sheet into a net-like structure of crossing filaments. The punched sheet is then oriented, as by stretching, well below the melt temperature of the materials, and then releasing. If square shaped holes are punched in the sheet, the step of orienting normally should be performed in two perpendicular directions, parallel to the filaments formed by punching the holes. If diamond shaped holes are punched in the sheet as shown in FIG. 2, it is possible to accomplish the orienting step in one operation in a direction parallel to the axis of extrusion.

Figure 1:
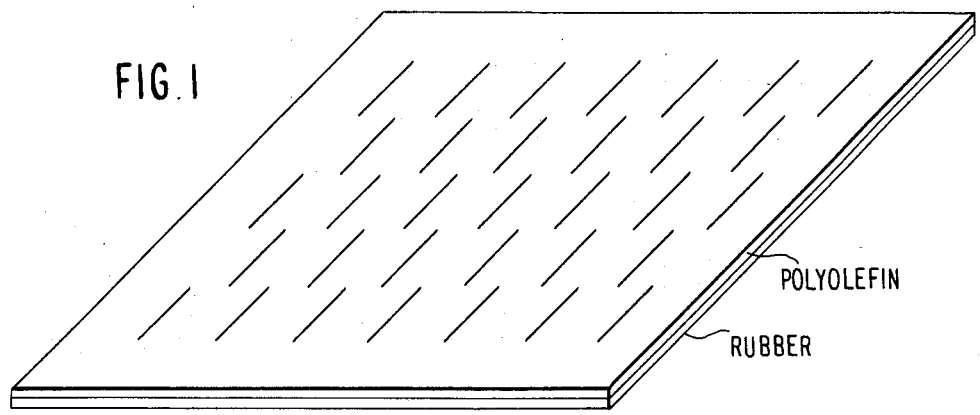
FIG. 1 is an isometric view showing a bi-component plastic sheet which has been slit prior to orientation.

Other techniques and processes can be used to form the holes in the bi-component sheet. For example, the holes can be formed by slitting to form, in a conventional manner, a slit film like that shown in FIG. 1. Especially when using this technique, the resulting slit film can be woven in a known way and then oriented. Another process for forming holes in the bi-component sheet is to wrap the sheet around a rotary texturing cylinder having a multiplicity of aperatures through which the sheet is drawn under a vacuum and at the softening temperature of the bi-component sheet. This forms small protrusions at regular intervals over the surface of the sheet, and these protrusions are then ruptured by subjecting the sheet to a greater vacuum. Such a technique is disclosed, for example, in U.S. Pat.

No. 4,151,240 to M. B. Lucas and R. H. Van Coney. As in the case of the bi-component sheet in which holes are formed by punching or slitting to thereby produce a net-like structure, the sheet is then oriented by stretching and releasing to produce the characteristic helical filaments. It is not even required that the holes actually be formed by rupturing prior to the step of orienting the sheet since those protrusions which have not ruptured will do so during the step of orienting. Taking this one step further, the holes merely need to be defined as impressions by an embossing process so that the places where the holes will be formed are very thin flashings between filaments. These flashings will be ruptured during the step of orienting to complete the process of forming holes.

Figure 3:
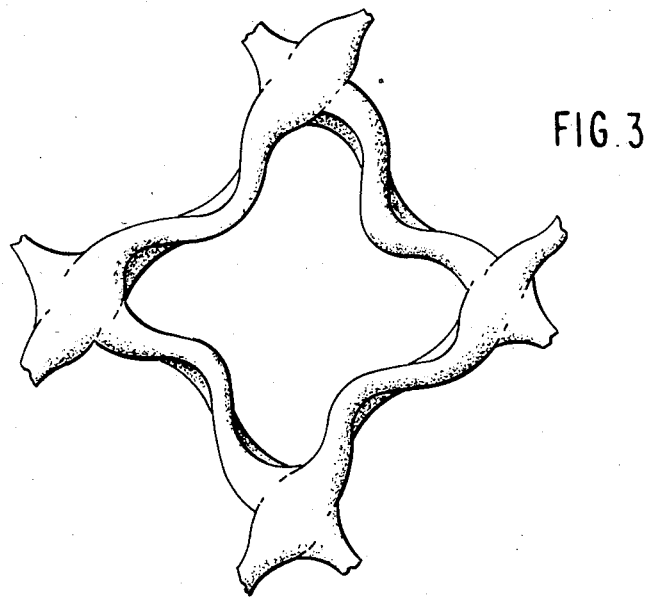
FIG. 3 is a planar view of the resulting spiral net after orientation.

The process of producing helical nets by first extruding a bi-component sheet, forming holes at regular intervals in the sheet, and then orienting the sheet has been found to produce a helical net like structure as shown in FIG. 3 which is fully equivalent to the helical net of my prior U.S. Pat. No. 4,353,956. Moreover, the process of co-exstruding two different materials in a sheet is easier to control, especially in larger sizes, than directly extruding the net with relatively rotating or reciprocating die members.

I claim:

1. A process for making a plastic net with a partial to a multiplicity of spirals between the interstices or crossings of the net filaments comprising the steps of extruding a multi-component sheet by the co-extrusion of at least two different plastic materials characterized by having different properties traction and orientation, forming holes in the multi-component sheet at regular intervals to thereby define the filaments of the net, and then orienting the multi-component sheet by stretching and releasing so that the individual filaments defined by the holes spiral.

2. The process as recited in claim 1 wherein the step of forming holes is performed by punching.

3. The process as recited in claim 2 wherein the holes punched in the multi-component sheet are diamond-shaped and the step of orienting is performed by stretching the punched sheet in a single direction parallel to the axis of extrusion of the multi-component sheet.

4. The process as recited in claim 1 wherein the step of forming holes is performed by slitting.

5. The process as recited in claim 1 wherein the step of forming holes is performed by drawing the multi-component sheet through apertures in a texturing surface to form protrusions in the sheet and then rupturing the protrusions.

6. The process as recited in claim 5 wherein at least some of the protrusions are ruptured by subjecting the opposite surfaces of the protrusions to a high differential pressure.

7. The process as recited in claim 5 wherein at least some of the protrusions are ruptured during the step of orienting the multi-component sheet.

8. The process as recited in claim 1 wherein the step of forming the holes is performed by first embossing the multi-component sheet to define thin flashing areas which flashing areas rupture during the step of orienting.

* * * * *